(12) United States Patent
Weinberg et al.

(10) Patent No.: US 6,300,030 B1
(45) Date of Patent: Oct. 9, 2001

(54) METHOD AND APPARATUS FOR MAKING A DESIGN AND/OR SIGN ON GLASS, GLASS-CERAMIC OR CERAMIC ARTICLES

(75) Inventors: Waldemar Weinberg, Seibersbach; Michael Zimmer, Zum Eichwald 31, 55444 Seibersbach, both of (DE)

(73) Assignees: Schott Glas, Mainz; Michael Zimmer, Saabrueken, both of (DE)

( * ) Notice: Subject to any disclaimer, the term of this patent is extended or adjusted under 35 U.S.C. 154(b) by 0 days.

(21) Appl. No.: 09/567,481

(22) Filed: May 9, 2000

(30) Foreign Application Priority Data

May 12, 1999 (DE) .............................. 199 21 923

(51) Int. Cl.⁷ .................................................. G03G 13/20
(52) U.S. Cl. .......................................... 430/126; 399/307
(58) Field of Search .................................. 430/106, 137, 430/126; 399/139, 307; 101/488, 483

(56) References Cited

U.S. PATENT DOCUMENTS 5,966,571 * 10/1999 Tavernier et al. ................... 399/139
5,988,068 * 11/1999 Van Ritter et al. .................. 101/488
6,110,632 * 8/2000 Dunford et al. ..................... 430/137

FOREIGN PATENT DOCUMENTS 44 13 168 C2   1/1998 (DE) .

* cited by examiner

*Primary Examiner*—John Goodrow
(74) *Attorney, Agent, or Firm*—Michael J. Striker

(57) ABSTRACT

The method of making a design and/or sign on glass, glass-ceramic and ceramic articles using a transfer agent includes providing a band-shaped carrier coated with a transfer agent; periodically advancing the band-shaped carrier coated with the transfer agent past a printing station; periodically printing the design and/or sign to be applied on the transfer-agent-coated band-shaped carrier with a heat-resistant toner to form respective printed toner images in succession on the band-shaped carrier in the printing station and registering reliably and periodically transferring the respective printed toner images to corresponding glass, glass-ceramic or ceramic articles by releasing the transfer agent from the band-shaped carrier.

11 Claims, 1 Drawing Sheet

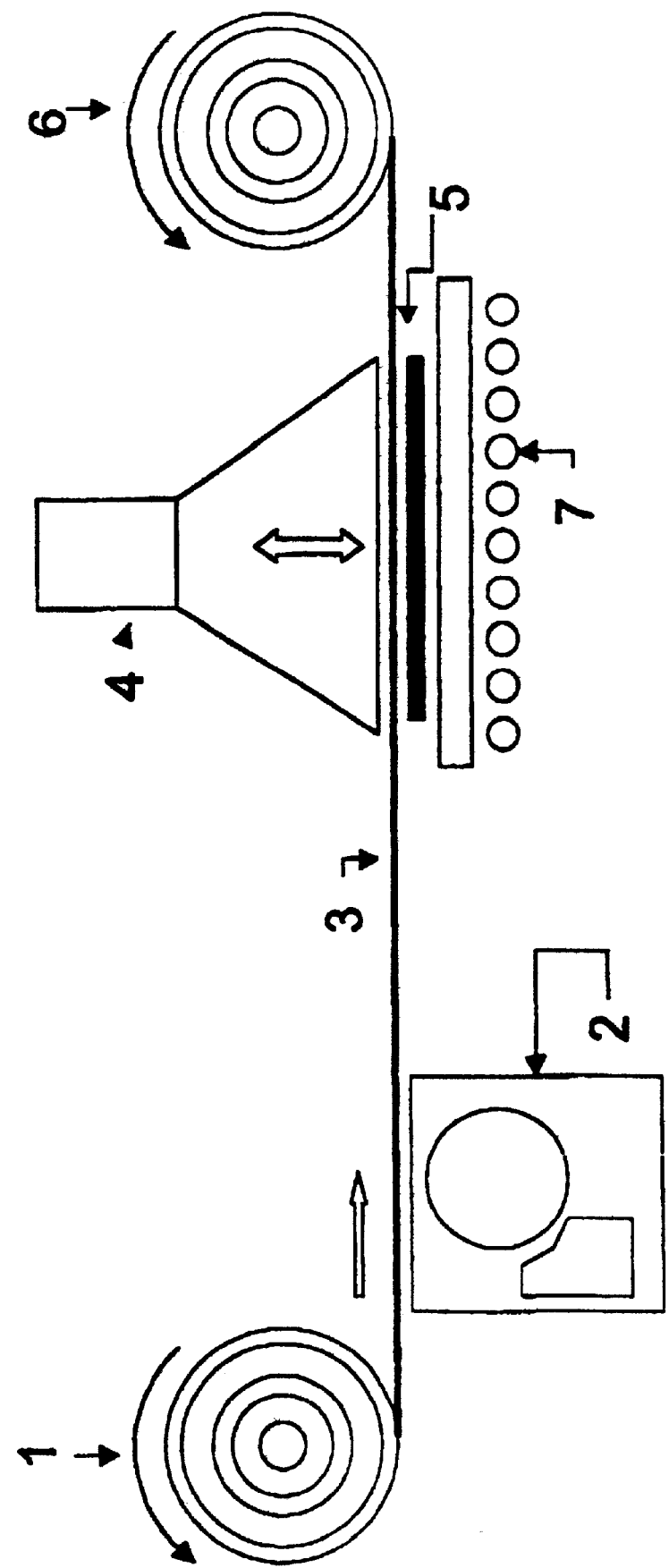

METHOD AND APPARATUS FOR MAKING A DESIGN AND/OR SIGN ON GLASS, GLASS-CERAMIC OR CERAMIC ARTICLES

BACKGROUND OF THE INVENTION

1. Field of the Invention

The present invention relates to a method for making a design and/or sign on each of a number of glass, glass-ceramic and ceramic articles using a transfer agent. The invention also relates to an apparatus for performing the method according to the invention, i.e. to an apparatus for making a design and/or sign on each of a number of glass, glass-ceramic and ceramic articles.

2. Prior Art

Designs are extensively used on glass, glass-ceramic and ceramic products to provide desired esthetically pleasing impressions. Lettering, signs or the like must be applied to certain products, in order to e.g. provide required information directly to the user. Glass-ceramic panels for cooking ranges, which have other operation and status information, and also colored designs, in addition to the trademark, e.g. CERAN®, should be mentioned here as a typical example.

Different methods are known for making these designs and/or signs, of which two are currently of practical importance.

In the first typical process ceramic pigments are directly printed on the glass and ceramic products by means of relevant printing techniques, the pigments are first dried so that they cannot be smudged and after that they are baked on. In the case of the above-mentioned glass-ceramic panel for the cooking range the pigments are typically baked on during the ceramicizing. In this case the printing does not occur on the manufactured glass-ceramic panel, but already on the blank to be ceramicized.

A permanent printed image is obtained on the glass or ceramic product by the above-mentioned process.

A screen stencil must first be prepared in the screen printing process used in general for the above-described printing process. Also the screen is made from a fine-meshed textile or wire web, which is held taught by means of a screen frame, which is covered on its image-free regions or positions with cut paper pieces, with inks for producing the signs or with a photographically made stencil. The ceramic pigments are applied directly to the glass or ceramic product by means of this screen stencil.

The making of the screen stencil is very expensive with known methods and unproductive for individual products. Also the printing pigments are applied through the open regions of the screen stencil manually with the help of a wiper or in a screen printing machine. The screen printing process is a wet process, in which a paste of ceramic colored pigments with printing oils is used as a colored ink, so that comparatively large and expensive machines with dryers are required. Also large work protecting and environmental problems are required in regard to the manufacturing process. The solvents present in the printing oils are comparatively highly volatile, so that expensive and troublesome work protecting measures must be taken and separate filter units are required. Besides in screen printing methods, as in offset printing, several printing steps are required in succession for different colors (e.g. cyan, magenta, yellow and black). This leads to a very large plant.

Furthermore in the known printing methods the reproducibility of colors for a comparatively large number of pieces cannot be guaranteed and also already after a comparatively small number of pieces, i.e. after about 100 printing processes, the screen stencil must be cleaned.

Among other disadvantages the resolution of the printed colors is limited by the grid of the screen stencil in screen printing processes. This means that the printed ceramic or glass products are frequently not satisfactory in regard to smoothness, uniformity and resolution of the color printing. Frequently in order to produce a desired product several special pigments must be used.

In the second type of process ceramic pigments are not applied directly on the glass and ceramic article, but instead on a transfer agent, such as a paper coated with gum arabic. The transfer agent prepared in this way is applied to the ceramic or glass article at the desired position and moistened, so that the paper may be removed leaving the pigments on the article (pressed image). Also transference by heating is also known. Finally the product is baked in a known manner, which leads to fusion of the ceramic pigment with the product. A permanent printed image is thus produced on the ceramic or glass article in this manner.

This second type of process operates according to the principle of image transference.

It is thus known to apply the ceramic pigments to the transfer agent by means of appropriate printing techniques, especially by means of screen printing, with the above-mentioned disadvantages of the screen printing techniques.

DE 44 13 168 C2 discloses a new type of ceramic toner, i.e. ceramic pigment composition for use instead of the conventional ceramic printing pigments or inks. This ceramic toner comprises fine particles of ceramic pigments, flux (glass), binding agent resin or resins and standard additives. It may be applied by means of an electrophotographic reproduction method (electro-copying process) to the transfer agent.

Using these features it is possible to provide a method of making decorated ceramic and glass articles that overcomes the above-described problems of the printing methods previously known in the art. A decorated ceramic and glass article can be produced, which is superior to the previously known decorated article (made by printing) in regard to fineness and resolution.

The known process permits a simple application of the image to the transfer agent.

Data for the desired images to be applied to the ceramic or glass article may be read in, e.g. by means of a digital color scanner or by using original graphic data. This data may then be transferred by means of a personal computer into an image memory of an electrophotographic reproduction device, e.g. a laser printer. This makes changes advantageously possible without much additional effort or expense, for example in the pigment shades, the resolution. Also graphic art and/or modifications can be transferred directly to the transfer agent by means of modern computer technology.

A disadvantage of this known process is that the images are printed on discrete sheets of the transfer agent, which must be handled in connection with further processing steps, in order to apply the images from these discrete sheets to the glass or ceramic article. Thus multiple steps are required for making the images on the article. In addition, because of the required individual handling of the discrete sheets and the exact application of the image on the glass or ceramic article, there is a danger that the images slip as they are transferred from the moistened or heated transfer agent during application. This behavior has been long known for transferred images. The images then are often distorted or deformed during application, and the tolerance requirements for the colored product are not satisfied.

SUMMARY OF THE INVENTION

It is an object of the present invention to provide a method of the above-described kind for making a design or sign on a number of glass, ceramic or glass-ceramic articles so that an exactly adjusted application of the image is possible to each article in a simple manner.

It is also an object of the present invention to provide an apparatus of the above-described kind for making a design or sign on a number of glass, ceramic or glass-ceramic articles so that an exactly adjusted application of the image is possible to each article in a simple manner.

According to the invention these objects are attained by a method comprising the following steps:

a) providing a band-shaped carrier coated with a transfer agent;

b) periodically advancing the band-shaped carrier past a printing station;

c) periodically printing the design and/or sign to be applied on the transfer-agent-coated band-shaped carrier with a heat-resistant toner to form respective printed toner images on the band-shaped carrier, and d) registering reliably and periodically transferring the respective printed toner images to corresponding glass, glass-ceramic or ceramic articles by releasing the transfer agent from the band-shaped carrier.

The apparatus according to the invention for performing the process according to the invention and for attaining the above-stated objects comprises:

means for periodically advancing a band-shaped carrier coated with a transfer agent, a printing station including means for periodically printing the design and/or sign to be applied on the transfer-agent-coated band-shaped carrier with a heat-resistant toner to form respective printed toner images on the band-shaped carrier, and a transfer station, which is arranged downstream of the printing station, this transfer station including means for reliably registering and periodically transferring the respective printed toner images to corresponding glass, glass-ceramic or ceramic articles by releasing the transfer agent from the band-shaped carrier.

Because the design and/or sign for the article is periodically printed as an image on the periodically advancing band-shaped carrier, it can be repeatedly applied to the corresponding articles reliably registered in a predetermined position relative to the band-shaped carrier.

According to a preferred embodiment of the invention the pertinent known materials, such as thermowax and gum arabic, are preferably used as the transfer agent.

A ceramic toner is preferably used for printing images on the transfer-agent-coated band-shaped carrier. The ceramic toner is a ceramic pigment composition, which is made from fine particles of ceramic pigments, flux (glass, binding agent resin) and conventional additives. The ceramic toner is preferably applied to the transfer agent by means of an electrophotographic reproduction method (electrocopying process).

The printed toner image preferably is fixed by means of heat, for example by means of infrared radiation, especially when several layers of the ceramic toner are printed over each other.

Several possible embodiments are known to one skilled in the art for preparation of the band-shaped carrier. According to one embodiment the band-shaped carrier is prepared by winding from a supply roll. Alternatively the preparation of the band-shaped carrier occurs in the form of an endless belt, which is periodically advanced.

BRIEF DESCRIPTION OF THE DRAWING

The objects, features and advantages of the invention will now be illustrated in more detail with the aid of the following description of the preferred embodiment, with reference to the accompanying sole FIGURE which is a side view of an apparatus for performing the method according to the invention, namely for making a design and/or sign to a glass, ceramic or glass-ceramic article.

DESCRIPTION OF THE PREFERRED EMBODIMENT

A band-shaped carrier, namely a paper band or a foil band, which is coated with a transfer agent, which is gum arabic or thermowax, is supplied by winding it off from a wound roll 1 acting as a supply roll. The band-shaped carrier or band-shaped substrate 3 is periodically advanced to an electrophotographic printing device 2 from this wound roll 1.

This printing device 2 has a conventional known structure according to the state of the art. A coating made of a special toner, preferably a ceramic toner as previously described above or another thermally suitable toner, is applied to portions of the carrier surface in the form of the design and/or sign to be applied. The portions of the carrier surface provided with the toner are fixed preferably by means of heat in the form of infrared radiation.

In the next cycle the band-shaped carrier 3 is exactly shifted to a predetermined transfer station or position over a locally justified solid substrate 5, which is one of the glass, glass-ceramic or ceramic products, on which the design and/or sign is to be applied.

The transfer station 4 lowers a heated stamp from above and presses the band-shaped carrier 3 with the portions having the toner fixed to it on the solid substrate 5. The thermowax or other transfer agent used is melted on the paper by the heat of the stamp and the toner on those portions of the band-shaped carrier 3 is transferred to the solid substrate 5. The wax in contact with the cool solid substrate 5 solidifies again and is thus fixed in regions corresponding to the portions of the band-shaped carrier 3 that it was previously on. The toner image is thus transferred by means of this classical "heat-release-process", which is applied on the gum arabic layer instead of a wax layer, although water release is preferred in that case.

The individual substrate 5 provided with a design and/or sign can then be conveyed to further process steps by means of a conveyor belt 7, which runs perpendicular to the drawing plane. At the same time the next substrate 5 is fed to the substrate band 3 of the transfer station 4 by means of the conveyor belt.

The band-shaped carrier 3 without the coating is wound up again into a wound roll 6 and subsequently disposed of or again coated with transfer agent again in a suitable station.

It is also conceivable to use an endless substrate belt, which is coated at a coating unit immediately after the coating of transfer agent is removed and from there it would be directly fed to the printing device 2.

The disclosure in German Patent Application 199 21 923.0-45 of May 12, 2000 is incorporated here by reference.

This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for applying a design and/or sign to glass, glass-ceramic and ceramic articles using a transfer agent, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A method for making a design and/or sign on glass, glass-ceramic and ceramic articles using a transfer agent, said method comprising the following steps:

a) providing a band-shaped carrier coated with a transfer agent;

b) periodically advancing the band-shaped carrier coated with the transfer agent past a printing station;

c) periodically printing the design and/or sign to be applied on the transfer-agent-coated band-shaped carrier with a heat-resistant toner to form respective printed toner images on the band-shaped carrier in the printing station; and d) registering reliably and periodically transferring the respective printed toner images to corresponding glass, glass-ceramic or ceramic articles by releasing the transfer agent from the band-shaped carrier.

2. The method as defined in claim 1, wherein the transfer agent is Gum Arabic.

3. The method as defined in claim 1, wherein the transfer agent is thermowax.

4. The method as defined in claim 1, wherein the transferring of the respective printed toner images to the corresponding glass, glass-ceramic or ceramic articles occurs according to a heat-release-process.

5. The method as defined in claim 1, wherein said heat-resistant toner is a ceramic toner.

6. The method as defined in claim 5, further comprising fixing the respective printed toner images on the glass, glass-ceramic or ceramic articles by heating after the transferring.

7. The method as defined in claim 1, wherein said band-shaped carrier is an endless belt.

8. The method as defined in claim 1, further comprising supplying the band-shaped carrier by unrolling a wound supply roll.

9. An apparatus for making a design and/or sign to glass, glass-ceramic and ceramic articles using a transfer agent, said apparatus comprising:

means for periodically advancing a band-shaped carrier coated with a transfer agent;

a printing station including means for periodically printing the design and/or sign to be applied on the transfer-agent-coated band-shaped carrier with a heat-resistant toner to form respective printed toner images, said printing station being arranged at a predetermined location next to the band-shaped carrier; and a transfer station arranged next to the band-shaped carrier and downstream of the printing station, said transfer station including means for reliably registering and periodically transferring the respective printed toner images on corresponding glass, glass-ceramic or ceramic articles by releasing the transfer agent from the band-shaped carrier.

10. The apparatus as defined in claim 9, wherein the means for printing includes an electrophotographic printing unit.

11. The apparatus as defined in claim 9 or 10, wherein the transfer station comprises a heatable stamp for pressing the band-shaped carrier with the respective printed toner images against one of the glass, glass-ceramic or ceramic articles and for transferring one of the respective printed toner images to said one of the glass, glass-ceramic or ceramic articles by releasing the transfer agent.

* * * * *